June 1, 1965  J. B. MURTLAND, JR., ETAL  3,186,043
METALLURGICAL FURNACE CONTROL
Filed April 2, 1963  6 Sheets-Sheet 1

INVENTORS
James B. Murtland Jr., Charles F. Rebhun
and Harold S. Jackson
BY
ATTORNEY June 1, 1965 J. B. MURTLAND, JR., ET AL 3,186,043
METALLURGICAL FURNACE CONTROL
Filed April 2, 1963 6 Sheets-Sheet 3

INVENTORS
James B. Murtland Jr., Charles F. Rebhun
and Harold S. Jackson
BY
ATTORNEY

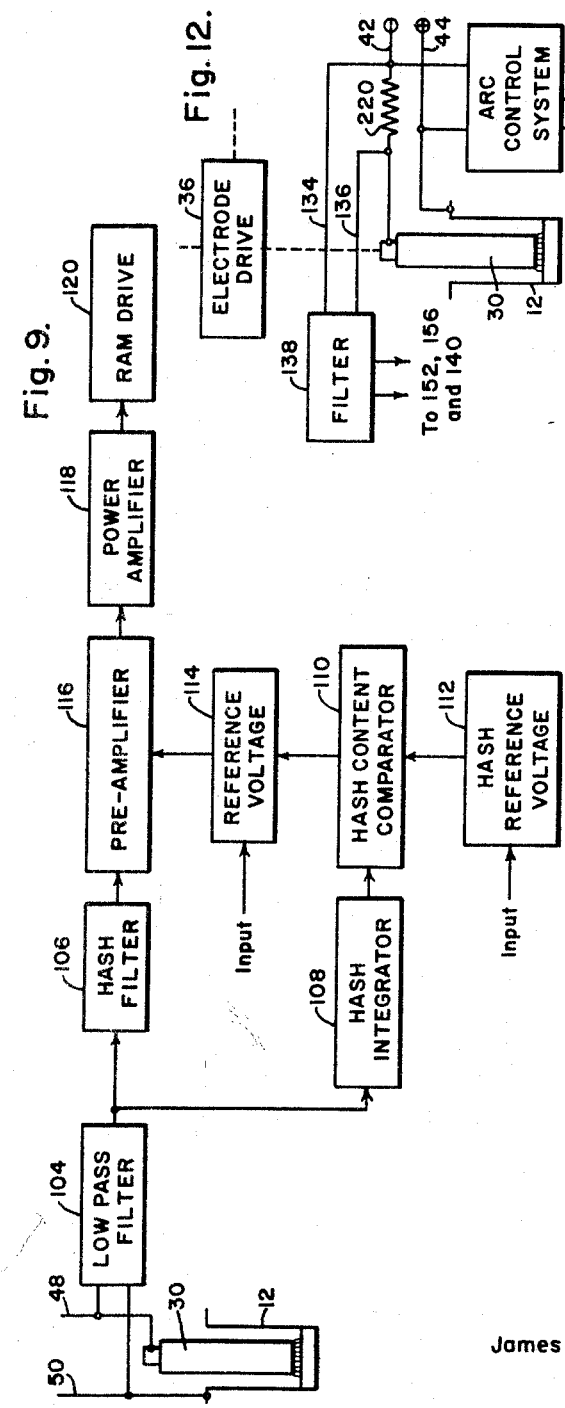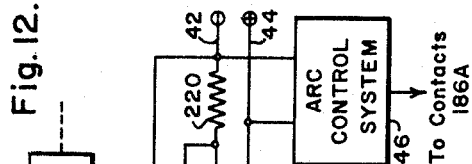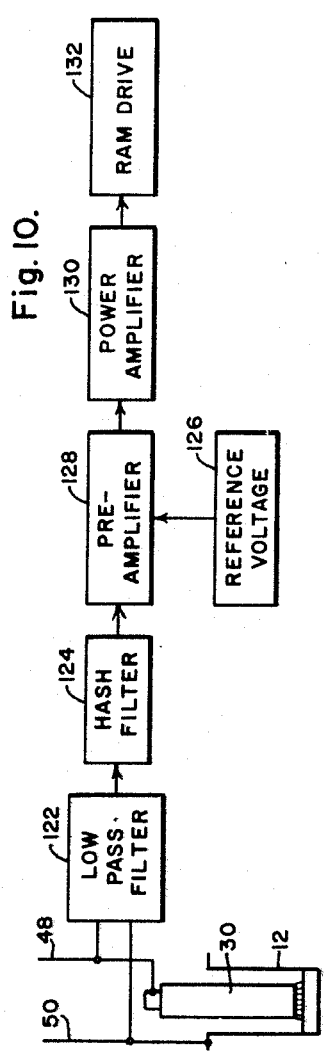

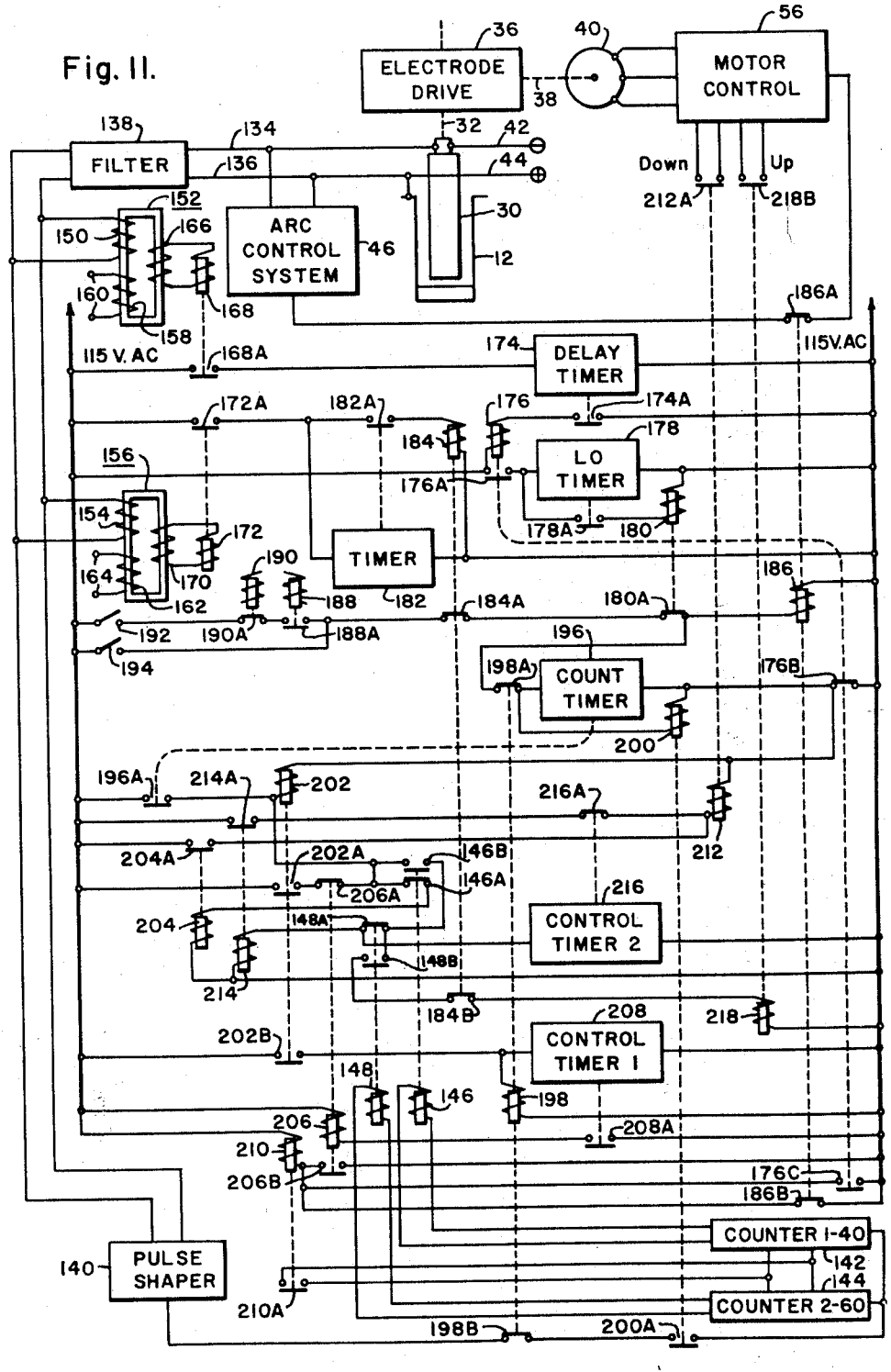

United States Patent Office 3,186,043
Patented June 1, 1965

3,186,043
METALLURGICAL FURNACE CONTROL
James B. Murtland, Jr., and Charles F. Rebhun, Natrona Heights, Pa., and Harold S. Jackson, Troy, N.Y., assignors to Allegheny Ludlum Steel Corporation, Brackenridge, Pa., a corporation of Pennsylvania
Filed Apr. 2, 1963, Ser. No. 270,088
13 Claims. (Cl. 22—200)

This invention relates to a method for regulating the position of an electrode in a consumable electrode arc melting furnace, and more particularly to a method of the type described adapted to maintain the electrode of such a furnace in predetermined relationship with respect to a molten metal pool beneath it.

The electrode regulating apparatus shown and described herein is claimed in copending application Serial No. 405,646, filed October 8, 1964, which application is a continuation of application Serial No. 270,087, filed April 2, 1963 and assigned to the assignee of the present application.

Consumable arc melting furnaces are now well known and usually comprise an electrode of the metal to be melted extending downwardly into a mold or crucible which receives the molten metal and within which an ingot is formed. The electrode is connected to one terminal of a direct current voltage source, and means are provided for electrically connecting the other terminal of the source to the mold and, hence, to the molten metal. Usually in starting the melt, a small supply of chips or the like are placed in the mold so that when the arc is struck such chips are melted to form an initial molten metal supply in the crucible mold; and as the arc is maintained between the electrode to be melted and the molten pool of metal beneath it, the end of the electrode is melted due to the heat of the arc. As the electrode is melted, it is deposited in and forms the aforesaid molten pool, the bottom portion of which continuously solidifies as the electrode melts to form an ingot which increases in length, starting from the bottom upwardly. In this process impurities float to and on the top of the molten pool; and assuming that the pool does not solidify during the formation of the ingot, the major portion of the impurities will be excluded from the main body of the ingot.

Such furnaces are usually employed to melt high quality stainless steels, other high quality alloy steels, or reactive metals such as titanium, zirconium and their alloys. The melting process in such a furnace is usually carried out under vacuum or inert atmospheric conditions, the reason being that the presence of air will cause the formation of oxides which contaminate the resulting product. The grain structure and generally quality requirements of the resulting ingot are most stringent. In this respect, it is oftentimes necessary or desirable to produce a resulting ingot having a substantially uniform grain structure throughout as well as to substantially completely eliminate inclusions, segregation, stringers and the like.

In the past, one of the most troublesome problems in the production of high quality ingots by the consumable electrode method has been the occurrence of "freckles" which comprise dark spots or specks in the microstructure of the ingot. Although the reasons for occurrence of such freckles are not entirely appreciated, it is believed that they may be due to minute particles of undissolved metal or non-metallic inclusions.

One of the major contributors to discontinuities and generally poor quality in the as-cast grain structure of an ingot produced in a consumable electrode arc melting furnace is arc instability which is a function of not only the distance of the electrode from the molten material, but also the pressure within the crucible in which the ingot is formed. Actually, there are many factors about the characteristics of the arc which are not completely understood; however, a short gap is usually considered desirable to minimize the tendency of the arc to form between the sides of the electrode and the mold walls and to concentrate the heat of the arc in the metal bath. Under normal conditions, the arc is anchored at and moves over the surface of the tip of the electrode, and it is expected that this is the preferred location of the arc because the cathode normally prefers a hot surface for thermionic emission. However, under certain conditions, the cathode tends to form a multitude of small spots which run up the electrode, these small spots comprising the instantaneous formation of the arc between the sides of the electrode and the mold wall. At first these spots do not have any material effect on arc operation; however if the factors influencing this tendency to form multiple spots continue to act, the arc may become completely unstable. Under this condition, the arc completely escapes from the tip of the electrode for a considerable length of time. While this condition exists, melting is not accomplished, reduced heat is being delivered to the ingot, and on small ingots the surface of the molten pool may actually completely freeze over under the influence of such an unstable arc during normal melting with the result that the impurities in the molten pool may be included in the cast ingot. Other undesirable characteristics of an unstable arc are "cold shuts" (i.e., interruption of the arc) and "secondary pipe" occurring in the as-cast grain structure.

The arc gap is usually in the range of about two inches or less, and it has been the practice to attempt to control the position of the electrode relative to the molten pool to maintain a more or less fixed arc gap, the theory being that with a fixed arc gap, the melting procedure will be more ro less uniform to produce the desired characteristics in the resulting ingot. In the past, most systems for maintaining the arc gap have relied upon arc voltage (i.e., the voltage gradient across the gap) for regulating purposes. That is, the arc voltage, or approximation thereof, was detected and this voltage used to drive a motor which raised or lowered the electrode, as the case may be, to maintain the arc gap. Apparatus for regulating the position of the electrode, which relies upon the arc voltage for regulating purposes, is not completely satisfactory since there is only a small change of arc voltage with arc gap length in the range of gap lengths normally used. Furthermore, as was mentioned above, the voltage drop across the arc is influenced by variables other than the length of the arc such as the pressure within the mold which may change abruptly upon the liberation of gases in the melting process. In addition, the arc voltage usually cannot be measured directly, and when the control voltage is derived from terminals connected to the electrode and the mold, the control voltage is affected by the voltage drops through the contacts, both of which may vary during the melting of the metal. Consequently, if the electrode is positioned so that a constant voltage is maintained between the electrode support and the molten metal, the length of the arc gap is not necessarily or consistently within the desired range. Still another difficulty experienced in attempting to control the position of the electrode as a function of arc voltage is complete or partial shorting of the arc. This condition is usually associated with arc instability; and although all of the factors contributing to shorting are not entirely understood, it is apparent that this condition makes the arc voltage control method something less than satisfactory.

The present invention involves a totally unique system for maintaining the arc gap of a consumable electrode furnace in predetermined relationship with respect to the aforesaid molten pool on top of the ingot. In contrast to prior art systems where an attempt was made to regulate the arc gap simply as a function of arc gap voltage with all of its attendant disadvantages, the present invention regulates the arc gap as a function of an electrical quantity heretofore not recognized. Specifically, it has been found that super-imposed on the base arc gap voltage are voltage discontinuities in the form of positive-going pulses each of which persists for a short time such as forty milliseconds at a frequency of below about thirty cycles per second. Characteristically, these arc voltage discontinuities occur in groups or bunches. Above a certain arc voltage (i.e., wide arc gap) and immediately after some arc disturbances, such as a short, the voltage discontinuities do not occur; however as the arc length is decreased, the discontinuities appear at what is believed to be optimum operating conditions. Surprisingly enough, and in contrast to what might be expected, these voltage discontinuities may be used in a servo system for controlling the arc gap.

Thus, it has been found that the voltage across the arc actually consists of two components. The first component may be termed the "base voltage" which is comprised of an anode voltage drop, plasma voltage drop and cathode voltage drop. On an instantaneous basis, the change in this base voltage with a change in arc length is usually referred to as the voltage gradient of the arc plasma. The second component of arc voltage, for want of a better name, may be termed "hash" which comprises the voltage discontinuities mentioned above. It has been found that the presence or absence of this hash has a substantial effect upon the melt rate, with very little change in apparent input power to the furnace. Where the hash is present during melting, the melt rate is found to be higher. It is thought that is caused probably by out-gassing of the metals during melting with a resulting increase of pressure in the melting chamber, and it is also possible that the hash is an indication of a confinement of the arc to an area between the electrode and the molten pool such that radiation to the surrounding crucible walls is minimized and the heat flow out of the melt area held a minimum. Where melting is accomplished in the absence of the hash condition and at a substantially constant arc voltage, a relatively uniform melt rate is also obtained but at a much lower rate than that obtained with the hash present. Furthermore, with hash present, the melt rate can be increased without an appreciable increase in power input; and under certain conditions power input actually appears to decrease with an increased melt rate when the power in the hash component of the arc voltage is not taken into consideration. Thus, it can be theorized that the presence of hash indicates optimum operating conditions.

Although the foregoing discussion has been more or less limited to voltage discontinuities, it should be understood that the voltage discontinuities give rise to other fluctuations in an electrical characteristic of the arc gap, such as current discontinuities which can be used for purposes of control. The current discontinuities, for example, comprise negative-going pulses which can be used in a control system in the same manner as the positive-going voltage pulses. Thus, it is the periodic increase in the impedance of the arc which causes the positive-going voltage pulse and negative-going current pulse to occur. In the claims which follow, the term "fluctuations in an electrical characteristic of the arc gap" means any of such fluctuations which occur within a predetermined frequency range.

As an overall object, the present invention seeks to provide a new and improved method for controlling the arc gap in a consumable electrode furnace to attain optimum operating conditions and to produce a resulting product of exceptional quality.

More specifically, an object of the invention is to provide a method for controlling the position of an electrode in a consumable electrode furnace as a function of the aforesaid recurring fluctuations in an electrical characteristic of the arc gap which recur within a predetermined frequency range.

In accordance with the invention, a method for controlling the electrode of an arc furnace is provided comprising the steps of placing an end of an electrode to be melted within a mold, passing an electrical current between the electrode and the mold whereby the electrode is progressively melted from its lower end and deposited in the bottom of the mold to form an ingot, detecting fluctuations recurring within a predetermined frequency range in an electrical characteristic existing between the ingot and the electrode, and controlling the position of the electrode with respect to the bottom of the mold as a function of the aforesaid fluctuations. Preferably, the position of the electrode is controlled as a function of the frequency of recurring voltage fluctuations which are filtered from the base arc gap voltage, or as a function of the integral of the voltage fluctuations. It should be understood, however, that control of the electrode as a function of frequency or as a function of the integral of the voltage fluctuations is not to be considered as limiting since other embodiments can be utilized such as control as a function of the pulse height of the fluctuations, pulse height above a threshold value, or pulse width and rise times.

In one embodiment of the method of the invention, the arc gap is controlled as a function of the aforesaid voltage discontinuities only within predetermined maximum and minimum voltage levels where the hash or voltage discontinuities are effective for control purposes. At all other times (i.e., outside the range of the maximum and minimum voltage levels) the electrode position is controlled as a function of arc voltage, however the method is such as to usually continuously operate within the hash region where the melt rate is at a maximum for a given input power.

The above and other objects and features of the invention will become apparent from the following detailed description taken in connection with the accompanying drawings which form a part of this specification and in which:

FIG. 9 is a block diagram of a further embodiment of the invention wherein the hash content is integrated and the resulting integrated voltage combined with true arc voltage to produce a control signal;

FIG. 10 is a block diagram of still another control system wherein the hash content is filtered from the true arc voltage to effect a control signal for regulating purposes;

FIG. 11 is a detailed schematic circuit diagram of the block diagram of FIG. 7 wherein the hash content is counted for purposes of control; and FIG. 12 is a portion of a schematic circuit diagram which may be incorporated into the system of FIG. 11, but which utilizes current pulses rather than voltage pulses for purposes of control.

Figure 1:
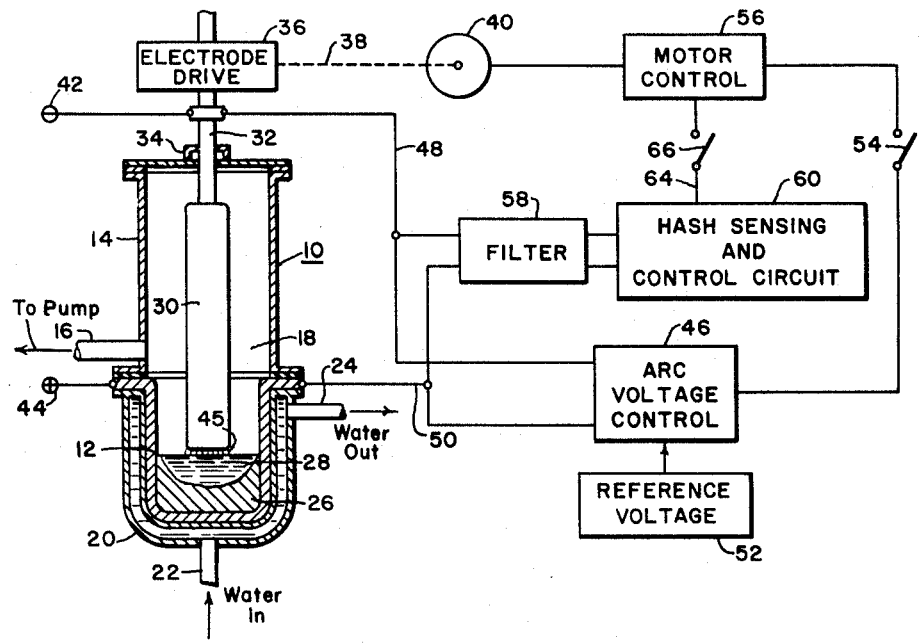
FIGURE 1 is a schematic diagram of a consumable electrode furnace including a block diagram of the hash control system of the present invention as well as the conventional arc voltage control system.

Referring now to the drawings, and particularly to FIG. 1, a consumable electrode arc furnace is schematically illustrated and identified by the reference numeral 10. The furnace comprises a conductive mold or crucible 12 which may, for example, be fabricated of copper. Covering the upper open end of the mold 12 is a gas-tight housing 14 having a connection at 16 to means, not shown, for evacuating the chamber 18 formed by the mold 12 and the housing 14 covering it. Alternatively, the chamber 18 could be filled with an inert gas; however in either case the metal to be melted is protected from oxidation. Surrounding the mold 12 is a water jacket 20 having inlet and outlet ports 22 and 24 connected thereto.

The mold 12 contains the ingot 26 which is formed from a molten pool 28 adjacent the lower end of an electrode 30 of the metal to be melted. Electrode 30 extends upwardly from the mold 12 and is connected at its upper end to a reciprocable rod or electrode ram carrier 32 which extends through a seal 34 in the housing 14. The ram 32 is connected to a suitable drive which may be either mechanical or hydraulic. In this specific embodiment the electrode drive 36 comprises a rack and pinion or worm and screw arrangement connected through shaft 38 to a drive motor 40, the arrangement being such that as the motor 40 is rotated in one direction, the ram 32 and electrode 30 carried thereby will move upwardly; whereas rotation of the motor 40 in the opposite direction will cause downward movement of the electrode 30. Connected to the ram 32 and, hence, to the electrode 30 is the negative terminal 42 of a direct current voltage source, not shown. Positive terminal 44 of this same voltage source is connected to the mold 12, the arrangement being such that an arc 45 will be struck between the lower end of the electrode 30 and the bottom of the mold 12 and where metal is in the mold between the electrode and the upper end of the ingot 26, thereby forming heat which progressively melts the end of the electrode and causes the formation of the aforesaid molten pool 28. As electrode 30 is melted it is, of course, necessary to move it downwardly by means of the motor 40 and electrode drive 36 in order to maintain the desired arc gap.

As was mentioned above, it has been the practice to attempt to control the position of the electrode 30 to maintain the desired arc gap by using the arc gap voltage as it appears between the electrode 30 and ingot 26. This control apparatus is schematically illustrated in FIG. 1 in its simplest form and comprises an arc voltage control circuit 46 connected through leads 48 and 50 to the electrode 30 and the mold 12, respectively. In circuit 46 the arc gap voltage is compared with a reference voltage from source 52; and assuming that switch 54 is closed, the difference voltage is applied to motor control circuit 56 to raise or lower the electrode 30, as the case may be. That is, if the arc voltage should fall, the arc gap is theoretically decreasing. Therefore, the circuit 46 will apply a voltage to motor control circuit 56 to cause motor 40 to raise the electrode 30. Similarly, if the arc voltage should rise, the arc gap is theoretically widening, and the circuit 46 will apply a signal to motor control circuit 56 to cause motor 40 to lower the electrode 30.

Figure 2:
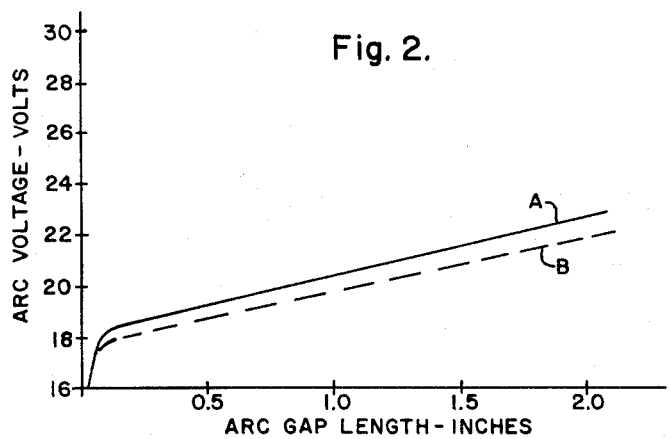
FIG. 2 is a graph illustrating a typical voltage gradient across the arc gap in a consumable electrode furnace as well as the variation in the gradient with variations in pressure.

As was explained above, the system just described for controlling the arc gap as a function of arc gap voltage is not completely satisfactory since there is only a small change of arc voltage with arc gap length in the range of gap lengths normally used. Furthermore, the voltage gradient across the arc is not constant. This is shown, for example, in FIG. 2 where arc voltage is plotted against arc length in inches. It will be noted that over a range of about two inches in arc length, the arc voltage varies only about two volts. Consequently, it is extremely difficult to sense variations in arc voltage as a function of electrode position. Furthermore, the arc voltage may vary not only as a function of arc length, but also as a function of the pressure within chamber 18. Thus, the arc voltage characteristic for a given arc length may be that shown by the full line curve A in FIG. 2 at one pressure, and that shown by the dotted line curve B at another pressure. Actually, the pressure is constantly varying within the chamber 18 and particularly in the zone of the arc per se due, among other reasons, to the liberation of gases during the melting process. In this connection, it is to be noted that there is no known practical means for measuring pressure in the arc zone in a commercial arrangement, meaning that the pressure cannot be correlated to the voltage. Consequently, it can be readily appreciated that the pressure within chamber 18 and, hence, the arc voltage for a given length is not constant. Still another disadvantage of the arc voltage control system is due to the fact that the voltage drop across the contacts to which the leads 48 and 50 are connected may not be constant. This may occur, for example, due to the heating of the contacts and other effects.

Figure 3:
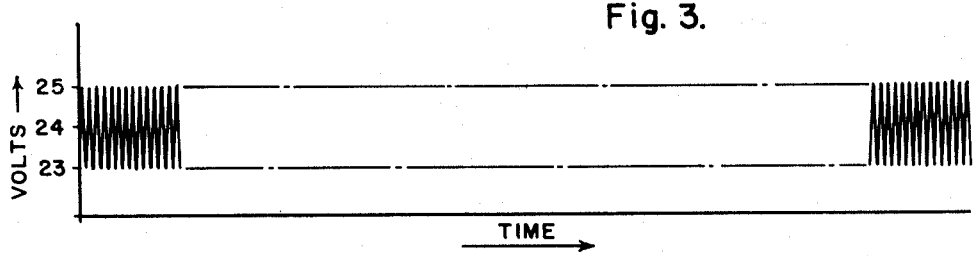
FIG. 3 is an illustration of the arc voltage in a consumable electrode furnace showing the ripple content therein before filtering.

The new and improved system of the present invention is schematically illustrated, in its simplest form, by the blocks 58 and 60 in FIG. 1. In this arrangement, the arc voltage is again sensed; however it is passed through a filter 58 to eliminate the ripple content in the direct current voltage applied to terminals 42 and 44. As is known, a direct current, other than that derived from a battery or other chemical source, is not absolutely unvarying in its magnitude, but will contain a small ripple which is due either to the rectifiers employed in rectifying an alternating current voltage or due to the action of a commutator in a direct current generator. The arc voltage as it may appear across leads 48 and 50 is shown in FIG. 3; and it will be noted that there is substantial ripple occurring at a frequency of about 360 cycles per second with a peak-to-peak voltage of about one to five volts above and below the median direct current voltage of twenty-four volts. In accordance with the present invention, the direct current voltage illustrated in FIG. 3 is passed through the filter 58 which eliminates the ripple content therein. In most applications, the filter 58 will be such as to pass only those recurring voltage fluctuations having a frequency beneath about thirty cycles per second. The specific value of thirty cycles per second, however, is not to be considered as limiting, the only requirement being that the filter eliminate the ripple voltage.

Figure 4:
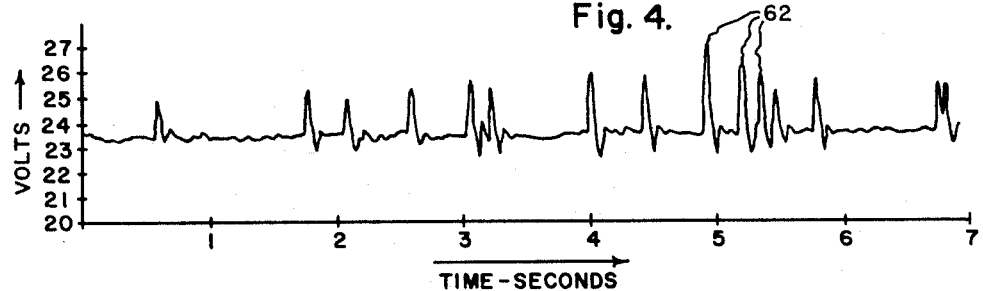
FIG. 4 is a graph illustrating typical voltage discontinuities comprising the aforesaid has which occur in the arc voltage at a predetermined frequency.

It would, of course, be expected that after passing through the filter 58 which eliminates the ripple content of the direct current voltage, a more or less unvarying steady-state direct current voltage would be obtained. Contrary to expectations, however, the output of filter 58 appears as shown in FIG. 4; and it will be noted that superimposed on the direct current voltage are positive-going voltage discontinuities 62 each of which persists for about forty milliseconds. Characteristically, the voltage discontinuities or pulses 62 occur in bunches and comprise the "hash" discussed above. The exact reason for the occurrence of the voltage discontinuities or hash is unknown; however the fact is that we have found that they do occur and we use such discontinuities in the present invention for controlling the position of electrode 30.

Referring again to FIG. 1, the output of filter 58 comprising a signal corresponding to that as shown in FIG. 4 is applied to the hash sensing and control circuit 60 adapted to produce an output signal on lead 64 which varies as a characteristic of the hash content. Assuming that the switch 66 is closed, this signal is applied to the motor control circuit to control the position of electrode 30. As will be understood, only one switch 54 or 66 will be closed at any one time; however since the hash occurs when the arc voltage is only within certain upper and lower limits of arc length, it will be appreciated that when the gap is outside of these limits, the switch 54 must be closed and arc voltage control employed. One specific arrangement for automatically switching from hash control to arc control to suit varying operating conditions and arc lengths is hereinafter described with reference to FIG. 11.

The hash sensing and control circuit 60 preferably counts or integrates the pulses or voltage discontinuities 62 in the signal shown in FIG. 4. As was mentioned above, however, these arrangements are in no way to be considered as limiting as other possibilities include measuring the widths of the pulses 62, measuring the rise time of the pulses, and other similar arrangements.

Figure 5:
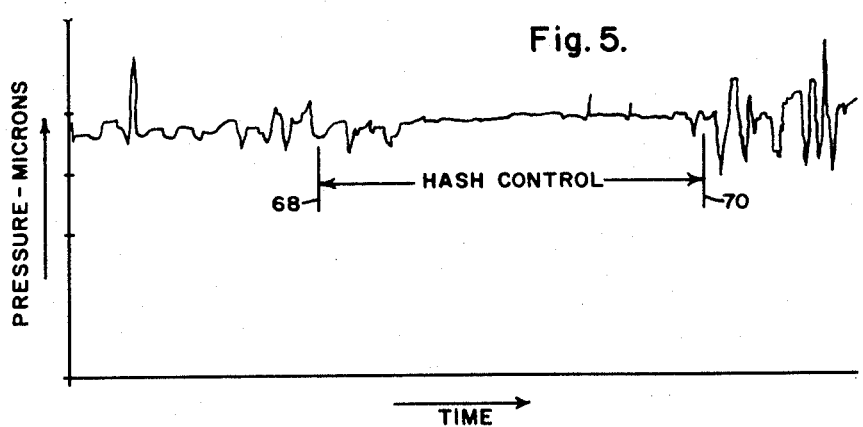
FIG. 5 is a graph illustrating the manner in which the pressure within a consumable electrode furnace is stabilized when the hash content of the arc voltage is employed to control electrode position.

With reference to FIG. 5, the effect of hash control on pressure within the chamber 18 is shown. Between points 68 and 70 the position of electrode 30 was controlled as a function of the hash content shown in FIG. 4; and it will be noted that the pressure is much more constant than at other times outside of the range between points 68 and 70 where arc voltage control is employed. This evidences the fact that during hash control, the liberation of gases is much more constant than during arc voltage control and accounts, at least in part, for the fact that during hash control the melting rate is constant and increased for a given input power.

Figure 6A:
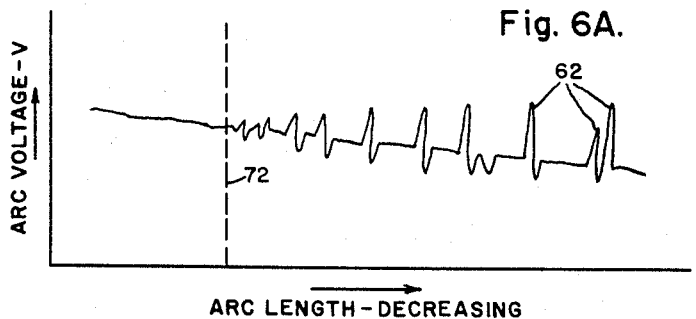
FIG. 6A is a graph illustrating the manner in which the hash occurs only beneath a predetermined arc length.
Figure 6B:
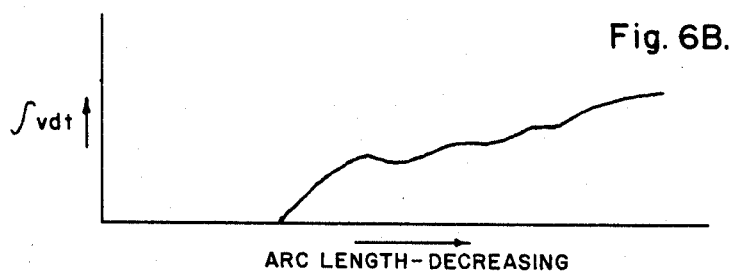
FIG. 6B is a graph illustrating the integrated hash content as the arc gap is decreased.
Figure 6C:
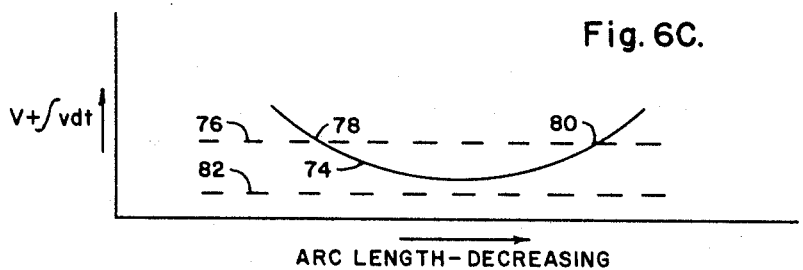
FIG. 6C is a graph illustrating a curve which occurs when the integrated hash is mixed with true arc voltage.

With reference now to FIG. 6A, it can be seen that above an arc length identified by the line 72, the hash or voltage discontinuities 62 do not occur. Below the arc length 72, however, the hash appears in the voltage gradient with the magnitude of the voltage discontinuities increasing as the voltage decreases. By integrating the hash content shown in FIG. 6A, the integral $\int V dt$ shown in FIG. 6B increases as the magnitude of the arc voltage decreases. As will be understood, this derivative can be used to control the position of the electrode 30 with respect to the molten pool 28 beneath it. Furthermore, as shown in FIG. 6C the integrated hash, when mixed with true arc voltage, can result in a dish-shaped curve 74. If a desired arc voltage identified by the line 76 in FIG. 6C is selected, it is possible that two balance conditions are possible, identified as points 78 and 80 in FIG. 6C. If point 78 is, by chance, the point reached first, the system will be stable and will feed the electrode downwardly properly. If, however, the point 80 on curve 74 is reached first, the system will be unstable since the slope of the voltage curve is reversed. If a desired arc voltage as represented by the line 82 is selected, the system will never reach balance and periodic dipping and shorting out will occur.

Figure 7:
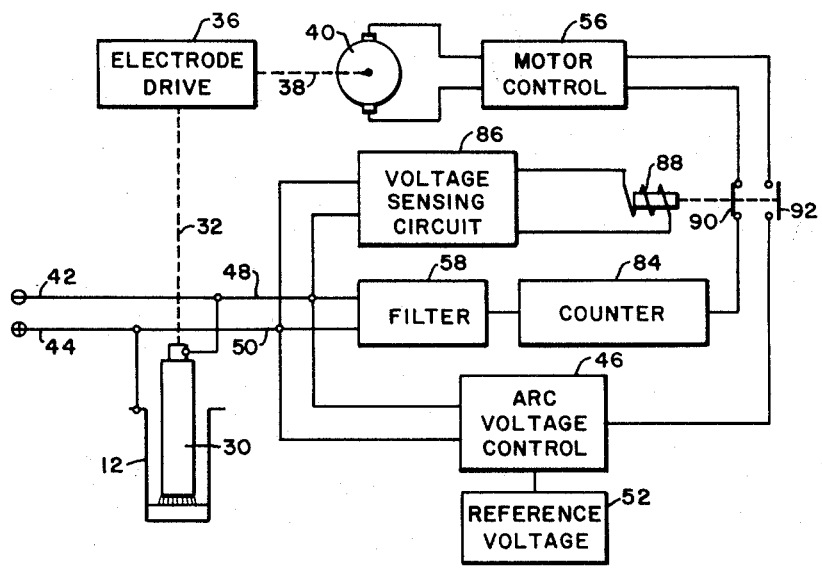
FIG. 7 is a schematic block diagram of one type of hash control system in accordance with the present invention wherein the hash content is counted.

With reference to FIG. 7, a control system is shown in which elements corresponding to those shown in FIG. 1 are identified by like reference numerals. In this case, the output of filter 58 is fed to a counter 84 which will apply a signal to the motor control circuit 56 to lower the electrode 30 when the pulses counted by the counter 84 fall below a predetermined number over a fixed period of time. If the arc voltage between the electrode 30 and molten pool 28 falls below or exceeds the voltage limits between which hash occurs, a voltage sensing circuit 86 will actuate relay 88 to open contacts 90 while closing contacts 92, thereby transferring the control from the hash content to arc voltage. Thus, hash control is effective above and below the aforesaid lower and higher voltage limits, while arc voltage control is in effect at all other times. Under actual operating conditions, however, the necessity of using voltage control will occur only under exceptional circumstances such as a short circuit, the hash control being in operation at all other times.

Figure 8:
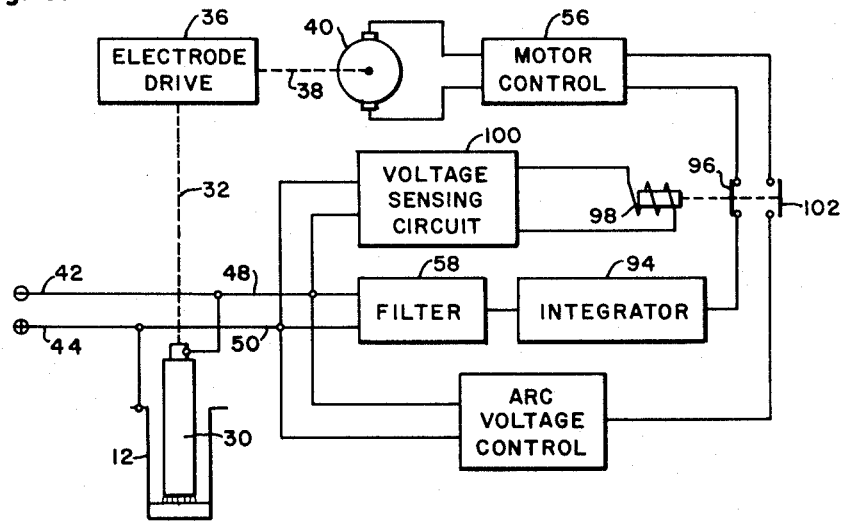
FIG. 8 is a schematic circuit diagram of another embodiment of the invention wherein the hash content is integrated and the integrated voltage used to control electrode position.

In FIG. 8 another control arrangement is shown wherein the output of filter 58 is applied to an integrator 94, the output of the integrator being applied through contacts 96 of relay 98 of the motor control circuit 56. Whenever the arc length falls below a level at which it intersects the curve 72 shown in FIG. 6A, the voltage sensing circuit 100 will actuate the relay 98 to open contacts 96 and close contacts 102 to transfer the control from the hash content to the arc voltage.

In FIG. 9 still another control arrangement is shown wherein the rectifier ripple is filtered from the arc voltage across leads 48 and 50 by means of a low pass filter 104 which is similar to the filter 58 shown in FIGS. 1, 7 and 8, and which is adapted to pass only those frequencies below about thirty cycles per second. After passing through the low pass filter 104, the resulting hash is divided into two channels. The one channel includes a hash filter 106 which removes the hash voltage from the filtered arc voltage leaving the true base arc voltage. The other channel includes a hash integrator 108 which provides a voltage at its output proportional to the amount of hash. This voltage is fed to a hash content comparator 110 where it is compared with a preset hash reference voltage from source 112. Variations of hash content from the hash reference voltage from source 112 are used to set a reference voltage in circuit 114. The reference voltage from source 112 is then compared to the base voltage of the arc from filter 106 in a preamplifier 116. Deviations of the base voltage from the reference voltage from source 112 are amplified in amplifier 118 and used to drive the ram through circuit 120.

Still another control arrangement is shown in FIG. 10. In this case, the rectifier ripple is again filtered by a low pass filter 122. The resulting hash voltage at the output of filter 122 is then passed through a second filter 124 which removes the hash content, leaving only the true base arc voltage. This base arc voltage is then compared with a reference voltage from source 126 in a preamplifier 128, and any deviations are applied through power amplifier 130 to the ram drive circuit 132.

With reference now to FIG. 11, a complete detailed circuit diagram for a control system employing the counter arrangement of FIG. 7 is shown. The arc voltage appearing between the electrode 30 and mold 12 is applied through leads 134 and 136 to a filter 138 which removes the ripple, leaving only the hash voltage comprising the voltage discontinuities described above which recur at a frequency below about thirty cycles per second. This hash voltage is adapted to be applied through a pulse shaper 140 and through contacts of relays, hereinafter described, to a pair of counters 142 and 144. The counter 142 may, for example, be set to count forty pulses representing forty voltage discontinuities in the hash content; while the counter 144 may be designed to count sixty pulses. Whenever the number of pulses to which the counter 142 or 144 is preset are counted, a relay 146 or 148, respectively, will be actuated.

Referring again to the leads 134 and 136 across which the arc voltage is applied, these leads are connected to a primary winding 150 of a first saturable core reactor 152 and also to a primary winding 154 of a second saturable core reactor 156. Also wound about the saturable reactor 152 is a bias winding 158 having input terminals 160 adapted for connection to a source of bias voltage, not shown. In a similar manner, a bias winding 162 is wound about the saturable core reactor 156 and is adapted for connection through terminals 164 to a source of bias voltage, not shown. The windings 150 and 158 and the bias voltage applied to terminals 160 is such that it opposes that applied to winding 150; and that applied to terminals 164 also opposes that applied to winding 154. Furthermore, the voltage applied to input terminals 160 is such that it will trigger core 152 when the voltage across input winding 150 (i.e., the arc voltage) falls below the minimum value at which hash control can be used. In a somewhat similar manner, the voltage applied to terminals 164 is such that the core 156 will trigger when the arc voltage exceeds that at which the hash appears, this voltage being represented by the line 72 in FIG. 6A. Consequently, when the arc voltage falls below the predetermined value at which hash control can be used, a voltage will be induced in output winding 166 of core 152 to actuate relay 168, thereby closing contacts 168A. Likewise, when the voltage rises above the maximum voltage at which hash control can be used, a voltage will be induced in output winding 170 on saturable reactor 156 to energize the relay 172 and close its normally open contacts 172A.

When contacts 168A close, they actuate delay timer 174. Delay timer 174, as well as the other timers hereinafter described, is of the type which will close a pair of contacts 174A after a predetermined period of time has elapsed subsequent to the closing of contacts 168A. If, however, the contacts 168A are not closed for the aforesaid predetermined period of time to which the timer 174 is set, the timer 174 will then reset itself automatically to begin counting for a full period without closing contacts 174A. Assuming that an under voltage condition occurs and that relay 168 is actuated to close contacts 168A and that these contacts are closed for a sufficient time to cause the timer 174 to close its contacts 174A, the relay 176 will be energized, thereby closing contacts 176A and 176C while opening contacts 176B. When contacts 176A close, they energize an LO timer 178, and assuming that the contacts 176A are closed for a predetermined period of time, the timer 178 will close its contacts 178A to thereby energize the relay 180. Thus, relay 180 will be energized upon the occurrence of an under voltage condition only upon the expiration of the time delays effected by timers 174 and 178 and will remain energized only so long as the under voltage exists. That is, when the under voltage condition ceases, contacts 168A, 174A, 176A and 178A will open to break the circuit to relay 180.

With reference, now, to the saturable reactor 156 and its associated relay 172, when contacts 172A are closed, they energize a timer 182, thereby causing it to close its contacts 182A after an amount of time determined by the time delay of timer 182. When contacts 182A close, they energize, through the previously closed contacts 172A, a relay 184. Thus, it can be seen that relay 180 will be energized upon the occurrence of an under voltage condition, but only if that under voltage condition persists for a predetermined period of time determined by the timers 174 and 178. Similarly, if an over voltage condition occurs, relay 184 will be energized, but only after a predetermined period of time determined by the time delay of timer 182. As will be seen, the relays 180 and 184 are used to disconnect the drive system for the electrode 30 from hash control and put it back into arc voltage control; however this will not occur until the under voltage or over voltage condition exists for a specified period of time as was explained above.

Relay 180 is provided with a pair of normally closed contacts 180A, while the relay 184 is provided with two pairs of normally closed contacts 184A and 184B. Contacts 180A and 184A are included in the energizing circuit for a relay 186, this relay having a pair of normally closed contacts 186A in the circuit connecting the arc control system 46 to the motor control circuit 56. Thus, whenever the contacts 186A are closed, the system will be operating under arc voltage control; whereas whenever the relay 186 is energized and contacts 186A open, arc voltage control will no longer be in effect and hash control takes over.

Also included in the energizing circuit for relay 186 are the normally open contacts 188A of a relay 188, the normally closed contacts 190A of a relay 190, and a manually operated switch 192. Relays 188 and 190 are connected to automatic programming equipment, not shown herein, adapted to energize the relay 188 at the beginning of a melting operation and to energize relay 190 at the completion of the melting operation. Thus, assuming that the switch 192 is manually closed, relay 188 will be energized to complete the circuit to relay 186, assuming that contacts 180A and 184A are not open. Alternatively, relay 186 can be energized with contacts 180A and 184A closed by closing manually operated switch 194 which is connected in shunt with switch 192 and contacts 188A and 190A. In either case, the relay 186 will be energized assuming that neither an over voltage or an under voltage condition exists.

At the start of the melting operation, the electrode 30 will be in contact with the bottom of the mold 12 or starter material therein and the arc voltage will be very low, thereby causing energization of relay 180 to open its contacts 180A. Consequently, at this time, the relay 186 will be deenergized and contacts 186A will be closed, whereupon the normal conventional arc control system 46 will cause the electrode 30 to move upwardly. After the voltage across the arc rises to the point where relay 168 is energized, the relay 180 will become deenergized to close contacts 180A, thereby energizing the relay 186 to open contacts 186A. At this point, the arc control system 46 is no longer connected to the motor control circuit 56 and the system is under hash control.

As soon as the contacts 180A close and the system goes into the hash control phase, a count timer 196 will be energized through the normally closed contacts 198A of a relay 198 and normally closed contacts 176B of relay 176 which is now reenergized due to the fact that the arc voltages has now exceeded its predetermined lower voltage limit at which hash control takes effect. At the same time that counter 196 is energized, a relay 200 is also energized through contacts 198A and 176B. Energization of the relay 200 causes its normally open contacts 200A to close; and assuming that the contacts 198B of relay 198 are not open due to energization of the relay 198, pulses from the pulse shaper 140 will be applied to the counters 142 and 144, whereupon each of the counters will begin its counting process.

After the expiration of the count time of counter 196, it will close its normally open contacts 196A, thereby energizing relay 202 which closes its normally open contacts 202A and 202B. When contacts 202A close, they energize a relay 204 through normally closed contacts 206A of a relay 206 and normally closed contacts 146A of relay 146 at the output of counter 142. The relay 204 will remain energized to close its normally open contacts 204A until relay 206 is energized or relay 146 is energized after the counter 142 has counted pulses in the hash signal equal to the preset count of the counter 142.

Referring again to the relay 202, when contacts 196A close, it is energized to close its contacts 202A and 202B. Contacts 202A provide a holding circuit for the relay 202. That is, once the contacts 202A are closed, the relay 202 will remain energized until the contacts 206A open, regardless of the condition of contacts 196A. When contacts 202B close, a control one timer 208 is energized; and after a predetermined period of time, the control one timer 208 will close its contacts 208A, thereby energizing the relay 206 to open contacts 206A, thereby breaking the circuit to relay 202. When relay 206 is energized, it also closes contacts 206B to energize relay 210; whereupon contacts 210A close t oreset the counters 142 and 144.

When contacts 204A on relay 204 close, they energize relay 212 which closes contacts 212A in the motor control circuit 56 to cause the electrode 30 to move downwardly. Downward movement of the electrode will continue until the circuit to relay 204 is broken and contacts 204A open. Relay 212 can also be energized through contacts 214A of relay 214 and through the normally open contacts 216A of a control two timer 216. Relay 214 may be energized through normally open contacts 196A of the count timer 196, through normally open contacts 146B of relay 146 and through normally closed contacts 148A of relay 148. Alternatively, relay 214 may be energized through contacts 202A, 206A, 146B and 148A. It will be readily appreciated that the relay 214 can be energized only when relay 146 is energized and relay 148 is deenergized. This occurs when the pulses in the hash content are at least equal to the count of counter 142 and less than the count of counter 144.

When relay 214 is energized, the control two timer 216 is also energized; and after a predetermined period of time it will open its contacts 216A to break the circuit to relay 212. Thus, whenever the relay 212 is energized by closure of contacts 214A, it will remain energized for a period of time determined by the control timer 216.

If a very high hash count is counted by counters 142 and 144, it means that the electrode 30 is too close to the molten pool beneath it. Hence, as mentioned above, the hash count increases as the arc gap decreases. Under these conditions, the relay 148 will be energized to open its contacts 148A, thereby preventing energization of relay 214 and also preventing energization of relay 212 to move the electrode 30 downwardly. Likewise, under these conditions the relay 146 will have been energized to open contacts 146A and prevent energization of relay 204. When the relay 148 is energized, however, it closes its normally open contacts 148B; and assuming that contacts 184B are closed in the absence of an over arc voltage condition, the relay 218 will be energized to close its contacts 218A, thereby causing the electrode 30 to move upwardly. This action will continue until the contacts 184B open. As was explained above, the relay 184 will be energized when the maximum desirable arc voltage is reached. Thus, the electrode 30 will move upwardly only until the maximum arc gap is reached; whereupon hash control will again take effect.

In the operation of the device, assuming that the arc voltage is within the maximum and minimum values within which hash control is effective, both of the contacts 180A and 184A will be closed. This causes energization of the relay 186 to open contacts 186A and break the circuit between the arc control system 46 and the motor control circuit 56. If at any time arc voltage should rise above or fall below the maximum and minimum permissible values respectively, relay 186 will become deenergized to close contacts 186A and connect the arc control system 46 to the motor control circuit 56. At the same time, the contacts 186B will close to energize relay 210 and reset each of the counters 142 and 144.

When hash control takes effect, the count timer 196 will be energized; and at the same time the relay 200 will be energized to close its contacts 200A, thereby applying pulses from the pulse shaper 140 to counters 142 and 144. The function of timer 196 is to determine the period during which pulses are counted by counters 142 and 144 before reset. This period will depend upon certain variables, one of which is the diameter of the electrode. That is, as the diameter of the electrode increases, the distribution of the pulses becomes less constant, meaning that the period of timer 196 should be increased as electrode diameter increases and vice versa in order to provide a statistically determinate system. It will be assumed that counter 142 will count forty pulses before energizing relay 146 and that counter 144 will count sixty pulses are not received by the counters 142 and 144, during the count period of the count timer 196, forty pulses are not received by the conuters 142 and 144, meaning that neither of the relays 146 nor 148 will be energized. Under these conditions, the hash rate is very low meaning that the electrode 30 should be moved downwardly through a maximum amount. At the expiration of the count time of timer 196 with less than forty pulses counted, the contacts 196A will close, thereby energizing relay 202. When contacts 202B close, the control one timer 208 is energized. At the same time, since relay 146 is not now energized and contacts 146A are closed, the relay 204 will become energized to close its contacts 204A, thereby energizing the relay 212. This closes contacts 212A to cause the electrode 30 to move downwardly. Downward movement of the electrode 30 will continue until the contacts 206A open. This occurs, as will be understood, upon the expiration of the time period of control timer 208 when contacts 208A close. Thus, when less than forty pulses have been counted the electrode 30 will be driven downwardly by a maximum amount determined by the time interval of control one timer 208.

Let us assume, now, that more than forty pulses have been counted and less than sixty pulses. Under these conditions, the relay 146 will become energized to open contacts 146A and close contacts 146B, but relay 148 will remain deenergized. With contacts 146A now open, the relay 204 cannot become energized; however relay 214 will become energized since contacts 148A are now closed with relay 148 deenergized. When relay 214 becomes energized, the contacts 214A close, thereby energizing relay 212 to close contacts 212A and again drive the electrode 30 downwardly. This action will continue until contacts 216A of control two timer 216 open. The control two timer 216 is energized at the same time that relay 214 is energized. Consequently, relay 212 will remain energized for a period of time determined by the control two timer 216, this time being less than the period of control one timer 208.

Now, if more than sixty pulses are counted by the counters 142 and 144, both of the relays 146 and 148 will be energized. This means that the electrode 30 is too close to the molten pool beneath it or at the desired spacing. With the relays 146 and 148 both energized, a circuit is now completed to relay 218 through contacts 146B and 148B. Relay 218 will remain energized as mentioned above until the contacts 184B open upon the establishment of the maximum arc voltage condition, whereupon hash control will again be put into effect.

The control sequence can be summarized as follows:

(1) Under voltage condition—relay 168 becomes energized, and after a period of time determined by timers 174 and 178, relay 180 will become energized to deenergize relay 186 and close contacts 186A. Consequently, the system now responds to signals from arc control system 46.

(2) Over voltage condition—relay 172 becomes energized, and after a period of time determined by timer 182, contacts 182A close to energize relay 184 and open contacts 184A, thereby again deenergizing relay 186 to close contacts 186A and again cause the motor control circuit 56 to be responsive to signals from the arc control system 46.

(3) At all times other than an over voltage or under voltage condition, relay 186 will be deenergized and system will operate under hash control.

(4) Hash control with count less than forty during period of count timer 196, meaning that electrode 30 should be lowered through a maximum preset amount—relays 146 and 148 will remain deenergized and relay 212 will be energized for the period of timer 208 to lower electrode 30 for the period of timer 208.

(5) Hash control with count greater than forty and less than sixty—relay 146 becomes energized, but relay 148 is deenergized to energize relay 212 for the period of timer 216, this period being less than that of timer 208 to drive electrode 30 downwardly, but through a shorter distance than when the count is less than forty.

(6) Hash control with count greater than sixty, meaning that electrode is too close to molten pool—both of the relays 146 and 148 will be energized to energize relay 218 to cause electrode 30 to move upwardly until relay 184 is energized to signal an over voltage condition, whereupon hash control again becomes effective. Alternatively, however, the relay 218 may be eliminated such that the electrode 30 will remain stationary until its lower portion has been melted sufficiently to again widen the arc gap.

With reference, now, to FIG. 12, a system is shown which is similar to that of FIG. 11 except that current discontinuities, rather than voltage discontinuities, are used to effect control. Elements of FIG. 12 which correspond to those of FIG. 11 are identified by like reference numerals. The system is the same as that of FIG. 11 except that instead of filtering arc voltage, arc current is filtered. This is derived by filtering the signal across an impedance, such as resistor 220, in the negative input power lead to the furnace. After filtering in circuit 138, the current discontinuities, which are negative-going as mentioned above, are used in the same manner as the voltage discontinuities of FIG. 11.

Although the invention has been shown in connection with certain specific embodiments, it will be readily appreciated that various changes in the method may be made to suit requirements without departing from the spirit and scope of the invention.

We claim as our invention:

1. In the process of consumable-electrode-forming a cast metal ingot, the steps comprising placing an end of an electrode to be melted within a mold, passing an electrical current between the electrode and the mold whereby the electrode is progressively melted from said end and is deposited in the bottom of said mold, the molten metal deposited in the mold progressively solidifying to build up an ingot, electrically filtering from the voltage gradient existing between the mold and the electrode those recurring voltage fluctuations which recur beneath about thirty cycles per second, the resulting filtered voltage being the true voltage gradient existing between the electrode and the ingot, integrating those recurring voltage fluctuations which recur beneath about thirty cycles per second, producing a voltage which varies in proportion to the integrated recurring voltage fluctuations, electrically subtracting said last-named voltage from the filtered true voltage gradient to produce an output control voltage, and positioning said electrode with respect to said ingot as a function of said control voltage.

2. In the process of consumable-electrode-forming a cast metal ingot wherein an end of an electrode to be melted is placed within a mold, a voltage gradient is established between the electrode and the mold, and an arc is struck between said electrode end and the mold to progressively melt the electrode from said end to build up an ingot from the bottom of the mold by solidification of a molten pool directly beneath said end, and wherein the voltage across the arc gap between said end of the electrode and the molten pool includes a base arc voltage component and a second component superimposed on the base arc voltage component and comprising voltage discontinuities in the form of positive-going pulses which occur beneath a predetermined maximum arc gap length; the improvement comprising sensing fluctuations in said second component of arc gap voltage, and controlling the position of said electrode with respect to said molten pool as a function of variations in said fluctuations to maintain the length of the arc gap beneath said predetermined maximum length while maintaining a sufficient spacing between the molten pool and electrode to minimize shorting therebetween.

3. The process of claim 2 wherein fluctuations in said second component of arc gap voltage are sensed as voltage changes.

4. The process of claim 2 wherein fluctuations in said second component of arc gap voltage are sensed as current changes.

5. The process of claim 2 wherein the arc gap voltage is a direct current voltage and wherein said fluctuations occur at a repetition rate beneath the frequency of any ripple content in the direct current arc gap voltage.

6. In the process of consumable-electrode-forming a cast metal ingot wherein an end of an electrode to be melted is placed within a mold, a voltage gradient is established between the electrode and the mold, and an arc is struck between said electrode end and the mold to progressively melt the electrode from said end to build up an ingot from the bottom of the mold by solidification of a molten pool directly beneath said end, and wherein the voltage across the arc gap between said end of the electrode and the molten pool includes a base arc voltage component and a second component superimposed on the base arc voltage component and comprising voltage discontinuities in the form of positive-going pulses which occur beneath a predetermined maximum arc gap length; the improvement comprising controlling the position of said electrode with respect to said molten pool as a function of variations in said fluctuations.

7. In the process of consumable-electrode-forming a cast metal ingot wherein an end of an electrode to be melted is placed within a mold, a voltage gradient is established between the electrode and the mold, and an arc is struck between said electrode end and the mold to progressively melt the electrode from said end to build up an ingot from the bottom of the mold by solidification of a molten pool directly beneath said end, and wherein the voltage across the arc gap between said end of the electrode and the molten pool includes a base arc voltage component and a second component superimposed on the base arc voltage component and comprising voltage discontinuities in the form of positive-going pulses which occur beneath a predetermined maximum arc gap length and which have a repetition rate which increases as the spacing between the molten pool and said end of the electrode decreases; the improvement comprising detecting the repetition rate of said positive-going pulses in the second component of arc gap voltage, and causing said electrode to move downwardly toward said molten pool when the repetition rate of said pulses falls below a predetermined value to thereby maintain a close spacing between the electrode and the molten pool while minimizing shorting therebetween.

8. In the process of consumable-electrode-forming a cast metal ingot wherein an end of an electrode to be melted is placed within a mold, a voltage gradient is established between the electrode and the mold, and an arc is struck between said electrode end and the mold to progressively melt the electrode from said end to build up an ingot from the bottom of the mold by solidification of a molten pool directly beneath said end, and wherein the voltage across the arc gap between said end of the electrode and the molten pool includes a base arc voltage component and a second component superimposed on the base arc voltage component and comprising voltage discontinuities in the form of positive-going pulses which occur beneath a predetermined maximum arc gap length; the improvement comprising detecting the repetition rate of the pulses in said second component of arc gap voltage, and controlling the spacing between said end of the electrode and said molten pool as a function of variations in the repetition rate of said pulses to maintain a close spacing between the end of the electrode and said pool while minimizing shorting therebetween.

9. In the process of consumable-electrode-forming a cast metal ingot wherein an end of an electrode to be melted is placed within a mold, a voltage gradient is established between the electrode and the mold, and an arc is struck between said electrode end and the mold to progressively melt the electrode from said end to build up an ingot from the bottom of the mold by solidification of a molten pool directly beneath said end, and wherein the voltage across the arc gap between said end of the electrode and the molten pool includes a base arc voltage component and a second component superimposed on the base arc voltage component and comprising voltage discontinuities in the form of positive-going pulses which occur beneath a predetermined maximum arc gap length; the improvement comprising sensing fluctuations in said second component of arc gap voltage, causing said electrode to move downwardly toward said pool when the arc gap voltage rises above a first predetermined value, causing the electrode to move upwardly away from said pool when the arc gap voltage falls below a second predetermined value, and controlling the position of said electrode with respect to said molten pool as a function of variations in said fluctuations of the second component of arc gap voltage when the arc gap voltage is between said first and second predetermined values.

10. In the process of consumable-electrode-forming a cast metal ingot wherein an end of an electrode to be melted is placed within a mold, a voltage gradient is established between the electrode and the mold, and an arc is struck between said electrode end and the mold to progressively melt the electrode from said end to build up an ingot from the bottom of the mold by solidification of a molten pool directly beneath said end, and wherein the voltage across the arc gap between said end of the electrode and the molten pool includes a base arc voltage component and a second component superimposed on the base arc voltage component and comprising voltage discontinuities in the form of positive-going pulses which occur beneath a predetermined maximum arc gap length; the improvement comprising sensing fluctuations in said second component of arc gap voltage, electrically integrating said voltage fluctuations, and controlling the position of said electrode with respect to said molten pool in response to variations in the integral of said fluctuations.

11. In the process of consumable-electrode-forming a cast metal ingot wherein an end of an electrode to be melted is placed within a mold, a voltage gradient is established between the electrode and the mold, and an arc is struck between said electrode end and the mold to progressively melt the electrode from said end to build up an ingot from the bottom of the mold by solidification of a molten pool directly beneath said end, and wherein the voltage across the arc gap between said end of the electrode and the molten pool includes a base arc voltage component and a second component superimposed on the base arc voltage component and comprising voltage discontinuities in the form of positive-going pulses which occur beneath a predetermined maximum arc gap length; the improvement comprising sensing the repetition rate of said positive-going pulses, causing said electrode to move downwardly toward the molten pool when the repetition rate of said pulses falls below a first predetermined rate, and causing said electrode to move upwardly away from the molten pool when the repetition rate of said pulses rises above a second predetermined rate.

12. In the process of consumable-electrode-forming a cast metal ingot wherein an end of an electrode to be melted is placed within a mold, a voltage gradient is established between the electrode and the mold, and an arc is struck between said electrode end and the mold to progressively melt the electrode from said end to build up an ingot from the bottom of the mold by solidification of a molten pool directly beneath said end, and wherein the voltage across the arc gap between said end of the electrode and the molten pool includes a base arc voltage component and a second component superimposed on the base arc voltage component and comprising voltage discontinuities in the form of positive-going pulses which occur beneath a predetermined maximum arc gap length; the improvement comprising sensing the repetition rate of said positive-going voltage pulses, causing said electrode to move downwardly toward the molten pool through a first predetermined distance when the repetition rate of said pulses is beneath a first predetermined value, and causing said electrode to move downwardly toward the molten pool through a second predetermined distance which is greater than said first predetermined distance when the repetition rate of said pulses is beneath a second predetermined value which is lower than said first predetermined value.

13. In the process of consumable-electrode-forming a cast metal ingot wherein an end of an electrode to be melted is placed within a mold, a voltage gradient is established between the electrode and the mold, and an arc is struck between said electrode end and the mold to progressively melt the electrode from said end to build up an ingot from the bottom of the mold by solidification of a molten pool directly beneath said end, and wherein the voltage across the arc gap between said end of the electrode and the molten pool includes a base arc voltage component and a second component superimposed on the base arc voltage component and comprising voltage discontinuities in the form of pulses which are caused by momentary increases in the impedance across the arc and which occur beneath a predetermined maximum arc gap length; the improvement comprising sensing fluctuations in said second component of arc gap voltage, and controlling the position of said electrode with respect to said molten pool as a function of variations in said second component of arc gap voltage.

References Cited by the Examiner

UNITED STATES PATENTS

| | | | |
|---|---|---|---|
| 2,026,943 | 1/36 | Kennedy et al. | 219—8 |
| 2,798,107 | 7/57 | Boron et al. | 314—74 |
| 2,889,386 | 6/59 | Gruber et al. | 214—73 |
| 2,956,098 | 10/60 | Gruber et al. | 13—13 |
| 3,035,149 | 5/62 | Matulaitis | 219—69 |

MICHAEL V. BRINDISI, *Primary Examiner.*

MARCUS U. LYONS, *Examiner.*

UNITED STATES PATENT OFFICE
CERTIFICATE OF CORRECTION

Patent No. 3,186,043            June 1, 1965

James B. Murtland, Jr., et al.

It is hereby certified that error appears in the above numbered patent requiring correction and that the said Letters Patent should read as corrected below.

Column 4, line 54, for "has" read -- hash --; column 10, line 30, for "reenergized" read -- deenergized --; line 64, for "close t oreset" read -- close to reset --; column 11, line 64, for "are not received by the counters 142 and 144," read -- before energizing relay 148. Let us assume that --; line 66, for "conuters" read -- counters --.

Signed and sealed this 22nd day of March 1966.

(SEAL)
Attest:

ERNEST W. SWIDER
Attesting Officer

EDWARD J. BRENNER
Commissioner of Patents